(12) United States Patent
Brockschmidt et al.

(10) Patent No.: US 11,618,248 B2
(45) Date of Patent: Apr. 4, 2023

(54) END OF ARM TOOL (EOAT) FOR LAYUP OF PRE-IMPREGNATED COMPOSITE LAMINATES AND ROBOTIC ARM CONTROL SYSTEM AND METHOD

(71) Applicant: Southwest Research Institute, San Antonio, TX (US)

(72) Inventors: Branson P. Brockschmidt, San Antonio, TX (US); Cody E. Bressler, San Antonio, TX (US); Joshua D. Langsfeld, Austin, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 16/927,343

(22) Filed: Jul. 13, 2020

(65) Prior Publication Data
US 2022/0009217 A1  Jan. 13, 2022

(51) Int. Cl.
| | |
|---|---|
| *B32B 38/18* | (2006.01) |
| *B25J 15/00* | (2006.01) |
| *B25J 15/02* | (2006.01) |
| *B25J 9/16* | (2006.01) |
| *B29C 70/38* | (2006.01) |

(Continued)

(52) U.S. Cl.
CPC ......... *B32B 38/1808* (2013.01); *B25J 9/1682* (2013.01); *B25J 9/1687* (2013.01); *B25J 15/0038* (2013.01); *B25J 15/0266* (2013.01); *B29C 70/386* (2013.01); *F16D 49/00* (2013.01); *F16D 65/16* (2013.01);

(Continued)

(58) Field of Classification Search
CPC ... B32B 38/1808; B25J 9/1682; B25J 9/1687; B25J 15/0038; B25J 15/0266; B29C 70/38; B29C 70/382; B29C 70/384; B29C 70/386; B29C 70/388
See application file for complete search history.

(56) References Cited

U.S. PATENT DOCUMENTS

| | | | |
|---|---|---|---|
| 8,902,085 B1 | 12/2014 | Ray et al. | |
| 2011/0185556 A1* | 8/2011 | Hirano | ................... B25J 9/0087 29/428 |

(Continued)

FOREIGN PATENT DOCUMENTS

CN    102730549 A    * 10/2012

OTHER PUBLICATIONS

International Search Report and Written Opinion from corresponding PCT Appln. No. PCT/US2021/014602, dated Aug. 16, 2021.

*Primary Examiner* — George R Koch
(74) *Attorney, Agent, or Firm* — Grossman, Tucker, Perreault & Pfleger, PLLC (57) ABSTRACT

An end of arm tool (EOAT) for use during manufacture of parts using one or more pre-impregnated composite plies is disclosed. In an embodiment, the EOAT includes a mechanical gripper arrangement with first and second fingers configured to supply a compressive force to grip a pre-impregnated composite ply therebetween. At least one of the first and second fingers include a roller member to engage opposite surfaces of the pre-preg ply and supply a compressive gripping force. The roller member on either or both the first and second fingers preferably include a torque regulator to selectively adjust an associated roller member's resistance to rotation via supply of a rotational torque resistance.

17 Claims, 7 Drawing Sheets

(51) Int. Cl.
*F16D 65/16* (2006.01)
*F16D 49/00* (2006.01)
F16D 121/04 (2012.01)
B29K 105/08 (2006.01)

(52) U.S. Cl.
CPC .............. *B29K 2105/0872* (2013.01); *B32B 2038/1891* (2013.01); *F16D 2121/04* (2013.01)

(56) References Cited

U.S. PATENT DOCUMENTS

| | | | |
|---|---|---|---|
| 2013/0090761 A1* | 4/2013 | Sejimo | B25J 13/085 |
| | | | 700/245 |
| 2017/0076617 A1 | 3/2017 | Schupp et al. | |
| 2019/0070772 A1* | 3/2019 | Stone | B29D 99/0003 |

* cited by examiner

“END OF ARM TOOL (EOAT) FOR LAYUP OF PRE-IMPREGNATED COMPOSITE LAMINATES AND ROBOTIC ARM CONTROL SYSTEM AND METHOD”

TECHNICAL FIELD

This specification relates generally to end of arm tools (EOATs) for robotic arms, and more particularly, to an EOAT for gripping pre-impregnated laminate plies during automated layup routines and a robotic arm control system and method for forming composite parts.

BACKGROUND INFORMATION

Pre-impregnated composite plies, also called pre-preg composite plies or simply prepreg plies, present unique material handling challenges due to flexibility and tackiness. In addition, given some of the relatively precise requirements necessary to conform a prepreg into a proper shape, final part formation can occur that does not have all desired properties.

One existing approach to layup of pre-preg plies includes so-called "hand" layup whereby multiple locations around a localized area of the pre-preg ply get tensioned manually by a laminator to generate shear and then adhered to a mold surface. For example, a laminator may use each hand to grip a pre-preg ply at different locations followed by a sequence of actions to adhere the pre-preg such as pressing the pre-preg against a mold. Hand layup can include multiple iterations of such tensioning and adhering, all the while carefully managing discontinuities, e.g., folding, and avoiding inadvertent contact with the pre-preg ply and itself as well as with previous layers of applied pre-preg plies as removal can be difficult given the high tackiness (also referred to as "tack") of pre-preg plies.

BRIEF DESCRIPTION OF THE DRAWINGS

These and other features advantages will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

Automation of forming parts using pre-impregnated composite plies has raised significant challenges based on material handling issues discussed above. Layup routines, such as the aforementioned hand layup technique, include a complex sequence of actions including grasping pre-preg plies at various different locations and performing various manipulations of the pre-preg ply including dynamic tensioning, e.g., to create and maintain tension, and maneuvering the portions in three-dimensional space and supplying sufficient pressure to ensure the pre-preg ply distorts and conforms to contours of a target mold. In addition, the resin content of pre-preg plies makes handling of the same sticky and difficult to release from the grasp of a laminator, and particularly challenging to release from itself or other layers of pre-preg plies.

Still further, over-tensioning of pre-preg plies (also referred to as over-shearing) can damage fibers or otherwise result in final parts that do not have desired/target properties such as tensile strength and shear strength. Conversely, under-tensioning of pre-preg plies can similarly result in degraded final part properties. Manual layup techniques, such as hand layup, are particularly susceptible to such failures given the challenge of maintaining precise tensioning parameters through complex layup processes.

Thus, continued improvement in parts formed from pre-preg plies is based at least in part on automated approaches that overcome the material handling difficulties and challenges related thereto.

Thus, and in accordance with an embodiment, an end of arm tool (EOAT) for use during manufacture of parts using pre-impregnated composite plies (also referred to herein as pre-preg plies) is disclosed. The EOAT includes a mechanical gripper arrangement with first and second fingers configured to supply a compressive force (also referred to herein as a clamping force) to securely grip a pre-preg ply. Each of the first and second fingers include a roller member, also referred to herein as a rotatable member, to engage opposite surfaces of the pre-preg ply and supply the compressive force to grip and preferably prevent the pre-impregnated composite ply from "slipping" therethrough. One or both of the first and second fingers further include a torque regulator to selectively adjust an associated roller member's resistance to rotation by supply of an anti-rotational force or what may be described as providing a rotational torque resistance. Preferably, both the first and second fingers include a torque regulator to adjust an associated roller member's resistance to rotation via supply of such anti-rotational force.

During layup, the torque regulator(s) of an EOAT consistent with the present disclosure engages an associated roller member by supplying an anti-rotational force to prevent/dampen rotation of the same. Preferably, the anti-rotational force or rotational torque resistance supplied to a roller member by an associated torque regulator is configured to generate a predetermined coefficient of friction therebetween, and thus by extension, introduce a predetermined resistance to rotation. In one non-limiting example, the amount of rotational torque resistance is preferably in the range of 2.0 in-lb to 10.0 in-lb. Each roller member is then preferably able to resist a predetermined amount of rotational force, e.g., torque, introduced when "gripping" a pre-preg ply and supplying a normal force to grip the pre-preg ply (also referred to herein as a compressive force) and generate in-plane tension to the pre-preg ply. Accordingly, the pre-preg ply gripped by the EOAT can preferably be prevented from slipping through roller elements and preferably will apply a force to the pre-preg in a direction that generally corresponds with the movement direction of the EOAT.

Conversely, when each torque regulator is disengaged from an associated roller member, the associated roller member is allowed to rotate and reduce transfer of tensioning force to the pre-preg ply, preferably to zero. This allows an EOAT to release the pre-preg ply fully from the EOAT while preferably also maintaining contact and control of the pre-preg ply by the EOAT. Alternatively, or in addition, this allows the EOAT to reposition to a different grip position around a perimeter of the pre-preg ply while preferably maintaining control and contact with the same.

More preferably, each torque regulator selectively applies a plurality of different anti-rotational forces. The plurality of different anti-rotational forces includes at least a first anti-rotational force calibrated to securely grip a pre-preg ply, e.g., to prevent slip of the ply through roller members during tensioning. Further, the plurality of anti-rotational forces preferably include a second anti-rotational force calibrated to maintain a pre-determined amount of tension, e.g., in-plane/axial tension, supplied by the EOAT to the pre-preg ply such that the EOAT may be repositioned and/or pulled free from the same by a linear release force (e.g., along a direction that extends substantially away from the pre-preg ply) while maintaining the pre-determined amount of tension. In this example, the pre-determined amount of tension (or holding tension) may therefore be set to an amount of force that avoids damaging a pre-preg ply. The linear release force may therefore be greater than the holding tension such that a pulling force introduced by movement of the EOAT (and/or associated robotic arm) away from the pre-preg ply that is equal to or above the linear release force results in rotational force, e.g., torque, sufficient to overcome roller element's resistance to rotation, and thus by extension, allows for repositioning (and/or release) of the pre-preg ply while maintaining control of a pre-preg ply via the holding tension.

The term "coupled" as used herein refers to any connection, coupling, link or the like. Such "coupled" devices are not necessarily directly connected to one another and may be separated by intermediate components or devices.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the target characteristic. To provide one non-limiting numerical example to quantify "substantially," minor variation may cause a deviation of up to and including ±10% from a target quality/characteristic unless otherwise provided by the present disclosure.

Figure 1:
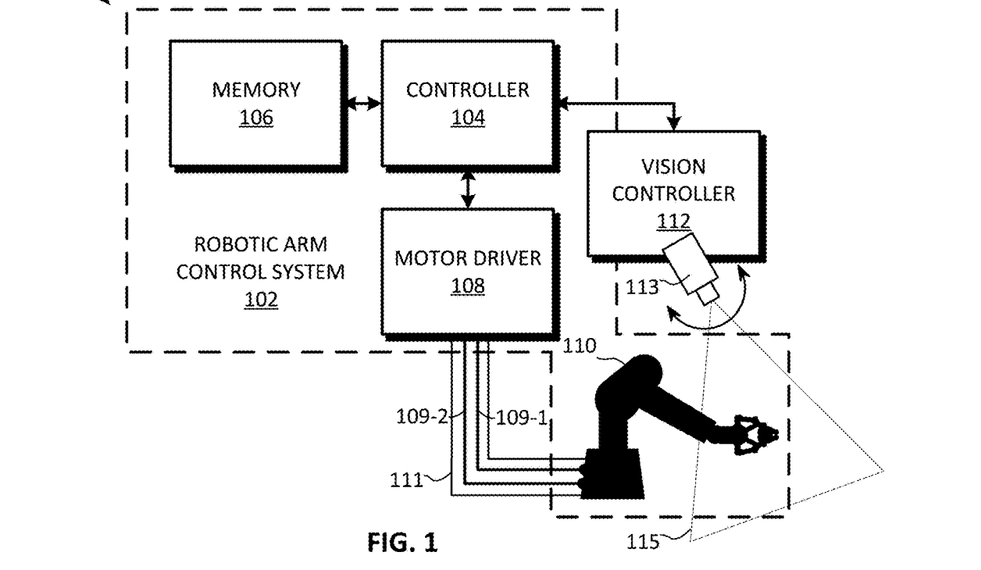
FIG. 1 shows an example robotic arm control system in accordance with embodiments of the present disclosure.

Turning to the figures, FIG. 1 shows an example embodiment 100 of a robotic arm control system 102, also referred to herein as simply control system 102. The control system 102 is preferably configured to perform an automated pre-preg layup process, such as process 900 of FIG. 9, and thus may also be accurately referred to as an automated prepreg layup control system 102.

Figure 2:
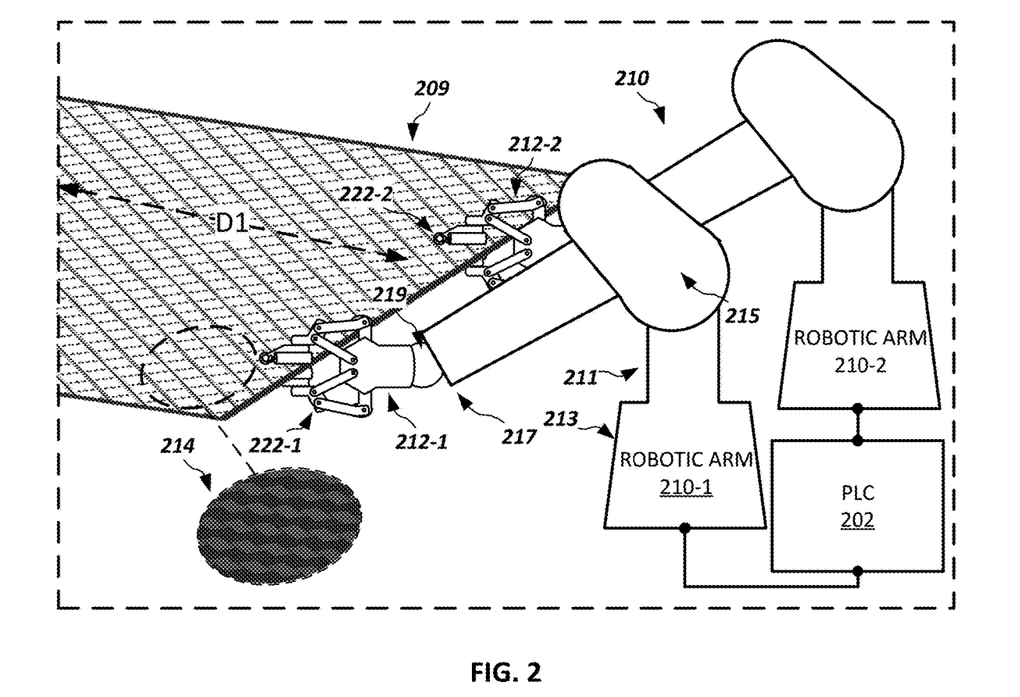
FIG. 2 shows an example plurality of robotic arms suitable for use in the robotic control system of FIG. 1, in accordance with an embodiment of the present disclosure.

Preferably, the control system 102 is implemented within at least one programmable logic controller (PLC) such as the PLC 202 shown in FIG. 2. However, the control system 102 may be implemented within other suitable controllers. Likewise, various components of the control system 102 may be implemented in hardware (e.g., circuitry, integrated circuits (ICs)), software (e.g., interpreted/compiled code, firmware), or a combination thereof.

Continuing on, the control system 102 includes a controller 104, a memory 106, a motor driver 108, and an optional vision controller 112. The components of the control system 102 can be implemented within a single housing/device, e.g., such as PLC 202, or within multiple devices in a distributed manner, for example.

The controller 104 comprises at least one processing device/circuit such as, for example, a microcontroller (MCU), a digital signal processor (DSP), a field-programmable gate array (FPGA), Reduced Instruction Set Computer (RISC) processor, x86 instruction set processor, microcontroller, an application-specific integrated circuit (ASIC).

The controller 104 may comprise a single chip, or multiple separate chips/circuitry. The controller 104 can implement various methods and features disclosed herein, e.g., process 900 of FIG. 9, using software (e.g., C or C++ executing on the controller 104), hardware (e.g., circuitry including hardcoded gate level logic or purpose-built silicon) or firmware (e.g., embedded routines executed by the controller 104), or any combination thereof. The controller 104 is preferably configured to output one or more driving commands (or driving signals) to cause a robotic arm, e.g., robotic arm 110, to perform one or more movement sequences, as discussed in greater detail below.

The memory 106 can comprise one or more volatile and/or non-volatile memory chips. The memory 106 can include machine-readable instructions, e.g., compiled or interpretable code, to allow for controller 104 to execute various processes such as process 900 of FIG. 9. In addition, the memory 106 preferably includes target mold characteristics (e.g., such as mold dimensions, and surface topology) and one or more predetermined layup techniques to be utilized during automated prepreg layup routines.

The motor driver 108 electrically couples to the controller 104, e.g., via a data bus, wired/wireless network, or other suitable approach, and is configured to convert the driving commands received from the controller 104 into at least a power signal 109-1 and a driving signal 109-2. The power signal 109-1 may comprise, for instance, a DC waveform having a predetermined voltage. The driving signal 109-2 may comprise N number of electrical signals to cause actuation of, for example, motors, linear actuators, dampers, relays, cams, or any other component within a robotic arm. In an embodiment, the driving signal 109-2 comprises at least one electrical signal to cause movement of a robotic arm, and more particularly, an arm portion and/or end of arm tool (EOAT) through the three-dimensional space surrounding the robotic arm during automated prepreg layup routines as variously disclosed herein.

The motor driver 108 also electrically couples to at least one robotic arm, e.g., robotic arm 110, via an electrical interconnect 111. The electrical interconnect 111 comprises, for instance, a cable having a plurality of conductors, e.g., electrically conductive wires formed of copper or other suitably conductive metal. The electrical interconnect 111 electrically couples various terminals (e.g., data, power, ground) of the motor driver 108 to corresponding terminals of the robotic arm 110.

Preferably, the motor driver 108 comprises a plurality of stepper motor drivers (not shown) for generating the power and driving signals 109-1, 109-2 respectively in a form suitable for use by stepper motors implemented within a robotic arm. In addition, the motor driver 108 preferably comprises one or power conversion circuits to receive power, e.g., from AC mains, and convert the same via DC-DC converters (not shown) for output as the power signal 109-1 and/or driving signal 109-2. For example, the motor driver 108 can be configured to provide a predetermined voltage of 5.0-12.0 Volts (V) and a maximum predetermined current, e.g., at least 0.8-1.0 Amperes (A), and preferably at least 1.0-10.0 A, to be drawn by the robotic arm 110.

However, the power conversion/supply circuitry for the robotic arm(s) (and/or associated stepper motors) may be disposed externally to the control system 102, e.g., within a robotic arm or a housing associated with the same, and in such cases the motor driver 108 may simply output driving signal 109-2 without providing the power signal 109-1.

The vision controller 112 comprises any hardware, software, or combination thereof for communicating with at least one camera sensor 113. The camera sensor 113 comprises any suitable image sensor, e.g., RGB, for capturing image data in a field of view 115 and outputting the same as a captured image frame. In an embodiment, the camera sensor 113 comprises a plurality of camera sensors with overlapping or non-overlapping field of views depending on a desired configuration. The vision controller 112 is configured to output captured image frames to the controller 104 via, for instance, a wired/wireless network, a data bus (e.g., a USB cable), or any other suitable approach.

The vision controller 112 can receive commands from the controller 104 to, for instance, initiate output of captured image frames, adjust framerates, adjust video/image quality characteristics, zoom in/out, and adjust an output format for the captured image frames (e.g., JPEG, MPEG, and so on). Preferably, the vision controller 112 is configured to allow for pan/tilt of the camera sensor 113. Thus, the vision controller 112 may be configured to also receive commands from the controller 104 to cause the camera sensor 113 to pan/tilt and adjust a field of view 115. In scenarios where the vision controller 112 implements a plurality of cameras, this can include the pan/tilting of multiple cameras to adjust each respective field of view to areas/regions of interest. For example, the field of view for one or more camera sensors may be adjusted to ensure that the same maintains (or "tracks") an EOAT tool within the same during automated pre-preg layup routines as disclosed herein.

In operation, the controller 104 sends a sequence of driving commands to the motor driver 108 to control position/actuation of at least one robotic arm, and preferably, a plurality of robotic arms positioned in an opposing orientation to hold/grip at least two opposite ends of a pre-preg ply such that fibers of the same get held in a tensioned state between opposing robotic arms. The driving commands may be based on, for instance, a preprogrammed sequence of events to cause the robotic arm 110 to move an associated EOAT tool within the three-dimensional space surrounding the same; adjust an angle of the EOAT tool relative to a prepreg ply (e.g., prepreg ply 209 shown in FIG. 2) to receive a portion of the prepreg ply between fingers of an associated mechanical gripper arrangement (also referred to herein as a mechanical finger arrangement); and actuate the mechanical gripper arrangement of the EOAT tool to securely "grip" the received portion of the pre-preg ply by application of a predetermined normal force also referred to herein as a gripping force or a compressive force.

Once the pre-preg ply is "gripped," the driving commands can be configured to cause the robotic arm 110 to execute a movement sequence and move an associated EOAT tool along one or more predetermined paths relative to a target mold (not shown), and to pose the EOAT tool at various predetermined angles while moving along the predetermined paths to cause the pre-preg ply to tension and conform to the various three-dimensional contours of the target mold. One such example movement sequence to automate layup of pre-preg plies is shown and described in greater detail below with reference to FIGS. 7A-7C.

Turning to FIG. 2, a preferred embodiment 200 shows the control system 102 implemented in a PLC 202, in accordance with an embodiment. As shown, the PLC 202 is communicatively coupled to a plurality of robotic arms shown collectively as 210 and individually as first and second robotic arms 210-1 and 201-2, respectively. In the broad context of the present invention, only one robotic arm can be utilized. Each of the preferred first and second robotic arms 210-1, 210-2 are disposed at locations adjacent one end of the pre-preg ply 209, and preferably adjacent corners of the pre-preg ply 209. As discussed in further detail below, additional robotic arms (not shown) may be disposed at an end of the pre-preg ply 209 opposite the first and second robotic arms 210-1, 210-2.

The pre-preg ply 209 comprises, for example, a pre-impregnated composite ply formed from a polymeric resin and fibers. Such polymer resin may include thermoset polymer resin (which undergoes crosslinking) or even thermoplastic resin (which can be reheated and reshaped). One preferred thermoset resin include epoxy resin or vinyl ester resins. The fibers preferably include carbon fiber, glass fiber, basalt fibers, aramid fiber or natural fibers. Composite is reference to the presence of polymer resin and fiber. The resin content of the pre-preg ply 209 is preferably in the range of 24% to 45% of the pre-preg ply by weight. The overall dimensions (length/height) of the pre-preg ply 209 is preferably between 9 inches and 36 inches, and preferably at least 12 inches. The overall width of the pre-preg ply 209 is preferably between 4 inches and 36 inches, and preferably at least 6 inches. As may be appreciated, even larger plies may be utilized if more robots are used within the system.

As shown, the first robotic arm 210-1 includes an arm 211 having a first end rotatably coupled to a base 213 and a second end defining an EOAT mating section 217. The first robotic arm 210-1 is preferably implemented as a six (6)-axis robotic arm to allow for the EOAT to be posed at any point up to and including 360 degrees about the robotic arm and at a desired orientation/angle.

The EOAT mating section 217 is configured to mount to an EOAT 212-1 and to actuate the same to, for instance, open/close the mechanical gripper arrangement, and selectively adjust an anti-rotational force supplied to associated rotatable member(s), as is discussed in further detail below.

A pivot/elbow 215 is preferably disposed between the first and second end of the arm 211 allows for the angle of the second end of the arm 211 to be adjusted relative to the first end. The pivot 215 therefore allows for the angle of EOAT 212-1 to be changed relative to the first end of the arm 211, and by extension, the base 213 at which the first end of the arm 211 mounts/couples. The EOAT mating section 217 may further include a joint 219 to allow for the angle of the EOAT 212-1 to be adjusted relative to the section of the arm 211 defining the EOAT mating section 217. Preferably, the joint 219 achieves ball joint motion (i.e. 3-axis of rotation) by having three axis/motors where the EOAT mounts allowing for up to substantially 360 degrees of movement freedom to angle/position the EOAT 212-1, e.g., similar to the freedom of movement a human hand has about a wrist. The second robotic arm 210-2 may be configured substantially the same as the first robotic arm 210-2, the description of which will not be repeated for brevity.

Each of the first and second EOATs 212-1, 212-2 preferably include a mechanical gripper arrangement 222-1, 222-2, respectively. Each of the mechanical gripper arrangements 222-1, 222-2 are preferably configured to selectively apply a plurality of gripping pressures/forces. In an embodiment, the plurality of gripping pressures include at least one predetermined normal force that, when applied to opposite surfaces of the pre-preg ply 209, generates friction sufficient to prevent lateral movement/slipping of the pre-preg ply 209 (hereinafter referred to as a secure grip force). In addition, the plurality of gripping pressures can further include a release force equal to 0.0 ksi or an amount less than the repositioning grip force to allow for an EOAT to decouple/release from the pre-preg ply 209.

The secure grip force (also referred to herein as a first compressive force) may be selected based on the target in-plane force to be supplied along direction D1 to the pre-preg ply 209 by the robotic arms 210-1, 210-2. The secure grip force may then be selected as a function of the in-plane force to ensure that the pre-preg ply 209 remains securely gripped by the first and second robotic arms 210-1, 210-2. In addition, the secure grip force may be selected based on the known compressive strength of the pre-preg ply 209 to prevent deformation/damage of the same.

To provide some specific, non-limiting, example values for the aforementioned secure grip force, consider a scenario where the pre-preg ply 209 is formed as pre-preg carbon ply having a twill weave 214 having a thickness of 0.3 mm at a weight of 5.7 oz/sq. yd. Such pre-preg carbon ply is available from FibreGlast as product 2211 and has a tensile strength of 510-635 ksi and a tensile modulus of 33.6 to 34.9 msi. Multiple plies of this thickness may be employed to provide an overall thickness of 6.35 millimeters (mm). Thus, an amount of compressive force sufficient to achieve the aforementioned secure grip on the pre-preg ply 209 can be between about 10 and 20 pounds clamping force.

As discussed in greater detail below, an EOAT consistent with the present disclosure can maintain a secure grip on a pre-preg composite ply while allowing for roller members of the mechanical gripper arrangement to be transitioned between an unlocked and locked configuration. In the locked configuration, torque adjusters of the mechanical gripper arrangement supply a predetermined anti-rotational force against a portion of a corresponding roller member, e.g., via a piston member, to increase rotational resistance of the roller member, similar to brake pads being biased against rotors to supply a braking force to the wheel of an automobile. The predetermined anti-rotational force supplied by the torque adjusters to corresponding roller members is preferably configured prevent rotational movement of the same such that that the fingers of the EOAT maintain grip at a fixed point on the pre-impregnated composite ply during movements about a target mold.

On the other hand, and when transitioned from the locked to the unlocked configuration, the EOAT allows for a predetermined amount of the pre-preg ply to "slip" through the mechanical gripper arrangement based on the torque adjusters reducing the supplied amount of anti-rotational force. The reduction of anti-rotational force may be predetermined to reduce the coefficient of friction between the torque adjusters and the roller members such that a pulling force introduced by the EOAT being drawn/pulled away from the pre-preg ply overcomes the roller member's resistance to rotation, and in response thereto, allows for rotation of the roller members to release/reposition the pre-preg ply. In the unlocked configuration, the EOAT preferably maintains a target compressive force, e.g., a force substantially equal to the secure grip force, against opposite sides of the pre-preg ply via associated roller members while allowing the roller members to rotate relative to each other and allow pre-preg ply to pass therethrough when drawing/pulling the EOAT away from the pre-preg ply.

Figure 3:
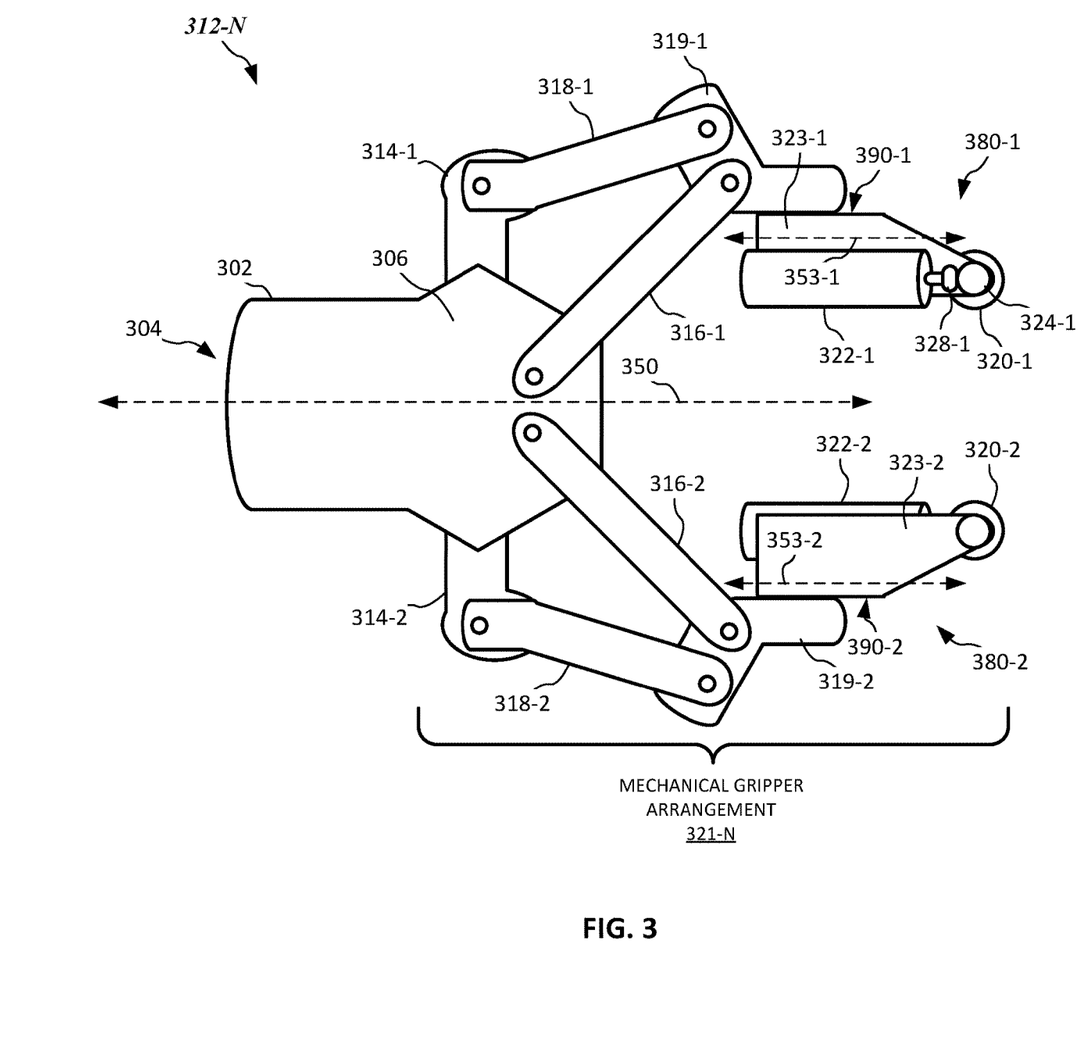
FIG. 3 shows an example end of arm tool suitable for use by the robotic arms of FIG. 2, in accordance with an embodiment of the present disclosure.

Turning to FIG. 3, an example EOAT 312-N is shown in accordance with an embodiment. The EOAT 312-N may utilized with the control system of FIG. 1 and is also suitable for use as the EOAT for the robotic arms 210 shown in FIG. 2. Accordingly, the foregoing aspects and features discussed above with reference to FIGS. 1 and 2 are equally to the EOAT 312-N and will not be repeated for brevity.

As shown, the EOAT 312-N includes a base 302. The base 302 extends from a first end to a second end along longitudinal axis 350. A first end of the base 302 defines a robotic arm mounting section 304, and a second end of the base defines a joint section 306.

The joint section 306 couples to a mechanical gripper arrangement 321-N. The joint section 306 preferably includes a gear arrangement (not shown) disposed therein that is configured to translate linear motion of a cam or other suitable device into rotational movement of linkages to actuate the mechanical gripper arrangement 321-N and to transition the same between an open and closed position/configuration, as is discussed further below. In embodiment, the actuation may be provided by, for instance, the EOAT mating section of a robotic arm as discussed above.

As further shown, the mechanical gripper arrangement 321-N includes at least two fingers, namely a first finger 380-1 and a second finger 380-2. Each of the first and second fingers 380-1, 380-2 include a series of linkages and pivots that allow the same to travel towards and away from each other in a substantially parallel manner. Accordingly, the EOAT 312-N may be accurately described as having a parallel grip configuration, although this disclosure is not necessarily limited in this regard and other grip configurations, e.g., such as angled/pinching configurations, are also within the scope this disclosure.

In any event, and as shown, first and second active linkages 314-1, 314-2 each include a first end that extends into the joint section 306 and a second end that extends away from the joint section 306. Each of the first and second active linkages 314-1, 314-2 extend substantially in parallel when the mechanical finger arrangement 312-N is in an open configuration, such as shown in FIG. 3.

The first end of the first and second active linkages 314-1, 314-2 that extend into the joint section 306 include, for instance, teeth or other suitable devices for engaging the gears within the joint section 306, as discussed above. The second end of the first and second active linkages 314-1, 314-2, include a pivot coupling for coupling to an associated linkage segment. As shown, this includes the first and second active linkages 314-1, 314-2 rotatably coupled to first and second linkage segments 318-1, 318-2, respectively.

As further shown in FIG. 3, the EOAT 312-N includes first and second passive linkages 316-1, 316-2. Each of the first and second passive linkages 316-1, 316-2 include a first end rotatably coupled to the joint section 306 and a second end that extends away from the joint section 306 in a direction substantially transverse relative to the longitudinal axis 350 of the joint section 306 (and the longitudinal axis of the first and second active linkages 314-1, 314-2), when the mechanical gripper arrangement 321-N is in the open configuration, such as shown in FIG. 3.

Further, the second end of the first and second passive linkages 316-1, 316-2 each extend away from the joint section 306 along a path that intersects with an imaginary line drawn longitudinally along the first and second linkage segments 318-1, 318-2, respectively. The first and second passive linkages 316-1, 316-2, preferably rotatably couple to first and second finger mounts 319-1, 319-2, respectively, adjacent an end of each. Likewise, the first and second linkage segments 318-1, 318-2, rotatably couple to the first and second finger mounts 319-1, 319-2, respectively, adjacent an end of each.

Figure 4:
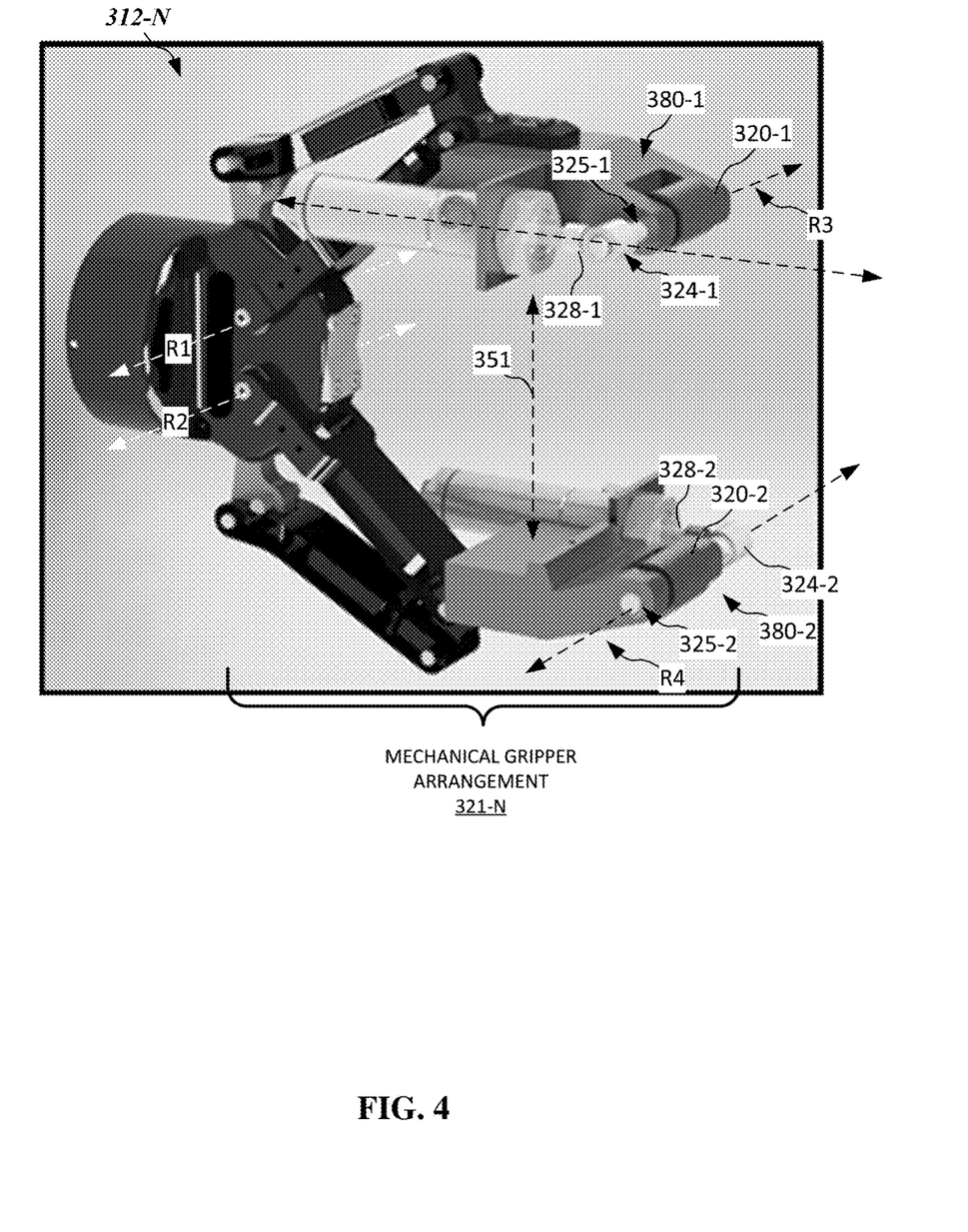
FIG. 4 shows a perspective view of the end of arm tool of FIG. 3, in accordance with an embodiment of the present disclosure.

Thus, and as shown more clearly in the example perspective view of the EOAT 312-N shown in FIG. 4, this arrangement allows for each of the first and second fingers 380-1, 380-2 to travel along a gripping axis 351 when transitioning from an open configuration, e.g., as shown in FIG. 4, to a closed configuration, e.g., as shown by first and second EOATs 212-1, 212-2 in FIG. 2. Travel along the gripping axis 351 is based at least in part on the various linkages discussed above (e.g., active linkages 314-1, 314-2, linkage segments 318-1, 318-2, and passive linkage segments 316-1, 316-2) forming a first set of pivot axis R1/R2 which extend substantially parallel to each other and allow for the collective linkages coupling the first and second fingers 380-1, 380-2 to rotate about the same to transition the mechanical gripper arrangement 321-N from the open to closed configuration, and vice-versa.

As further shown in FIG. 3, and with additional reference to FIG. 4, the EOAT 312-N further includes each of the first and second fingers 380-1, 380-2 having first and second bodies 323-1, 323-2, respectively, formed with a substantially wedged-shape profile, although other shapes and configurations are within the scope of this disclosure. Each of the first and second bodies 323-1, 323-2 of the first and second fingers 380-1, 380-2 extends from a first end to a second end along longitudinal axis 353-1, 353-2, respectively. The first end of each of the first and second bodies 323-1, 323-2 is adjacent/proximal to the joint section 306 and the second end of each extends away from and is distal to the joint section 306.

Each of the first and second bodies 323-1, 323-2 of the first and second fingers 380-1, 380-2, respectively further include an angled surface that extends from mating surfaces 390-1, 390-2 to the second end. The first and second fingers 380-1, 380-2 further include first and second roller members 320-1, 320-2 rotatably coupled to the second end of their respective bodies. As more clearly shown in FIG. 4, each of the roller members 320-1, 320-1 define a rotational axis, e.g., R3, that extends along their respective longitudinal axis to allow for rotational movement. The longitudinal axis of the first and second roller members 320-1, 320-2 extend substantially transverse relative to the longitudinal axis 353-1, 353-2 of the first and second fingers 380-1, 380-2, and substantially parallel with each other.

The first and second bodies 323-1, 323-2 further define first and second substantially flat mating surfaces 390-1, 390-2, respectively. The first and second substantially flat mating surfaces 390-1, 390-2 are configured to securely couple to the first and second finger mounts 319-1, 319-2, respectively.

In addition, the first and second fingers 380-1, 380-2 travel along the gripping axis 351 preferably in a substantially parallel manner such that the corresponding longitudinal axis 353-1, 353-2 (see FIG. 3) remain substantially parallel with each other as the mechanical gripper arrangement 321-N transitions between open and closed configurations.

As further shown in FIG. 4, the first and second fingers 380-1, 380-2 are aligned such that a common axis shown generally extending along 351 intersects with a center region of each. Stated differently, the first and second fingers 380-1, 380-2 are aligned such that, when the mechanical gripper arrangement 321-N transitions from an open configuration to a closed configuration, the longitudinal center line of each of the first and second fingers are substantially in parallel with each other, and the respective bodies are disposed substantially coextensive with each other, e.g., as shown in the example embodiments of FIGS. 2, and 5-8. In addition, the longitudinal axis of each of the first and second roller members 320-1, 320-2 also preferably align such that the same extend substantially parallel relative to each other and are configured to supply a normal force (or compressive force) in opposing directions when the mechanical gripper arrangement 321-N is transitioned to the closed position (See FIG. 5).

Figure 6:
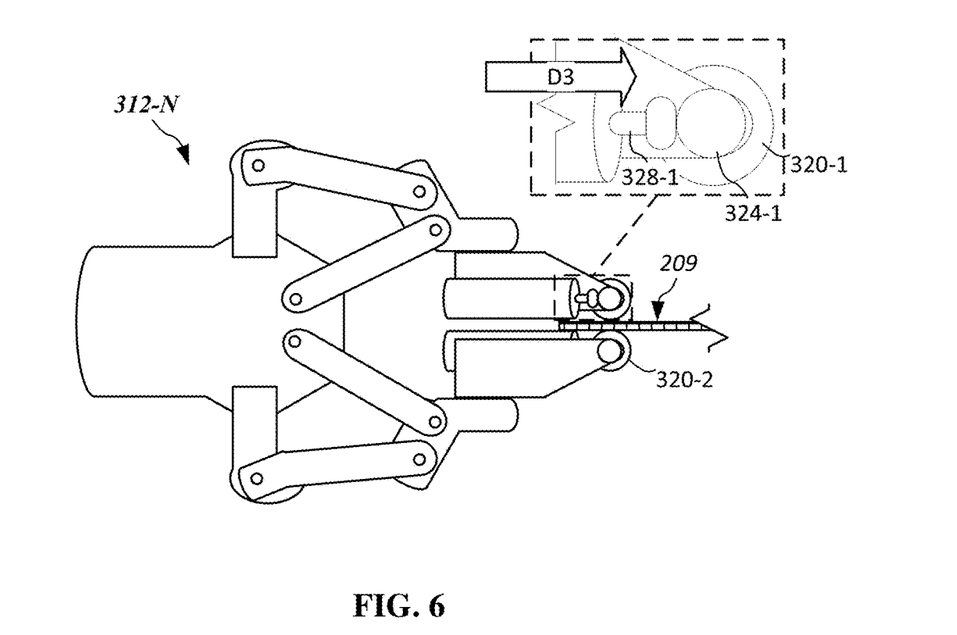
FIG. 6 shows the end of arm tool of FIG. 3 in a closed/clamping configuration, in accordance with an embodiment.

Preferably, the alignment of the first and second roller members 320-1, 320-2 allows for a substantially equal amount of compressive force to be supplied uniformly along the entire length of each, and preferably, along the pre-preg ply sandwiched between the first and second roller members 320-1, 320-2 (See FIG. 6).

As further shown in FIG. 3, the EOAT 312-N preferably includes first and second torque regulators 322-1, 322-2. The first and second torque regulators 322-1, 322-2, preferably couple to a respective body of the first and second fingers 380-1, 380-2, respectively. The first and second torque regulators 322-1, 322-2 may therefore each include a longitudinal axis that extends substantially parallel with the longitudinal axis of a respective finger and substantially transverse relative to a longitudinal axis of the roller members. For example, the first torque regulator 322-1 can include a longitudinal axis that extends substantially parallel with the longitudinal axis 353-1 of the first finger 380-1, and the second torque regulator 322-2 can include a longitudinal axis that extends substantially parallel with the longitudinal axis 353-2 of the second finger 380-2.

Each of the first and second torque regulators 322-1, 322-2 may comprise, for instance, a pneumatic piston or other suitable device for selectively causing an anti-rotational force to be supplied against a surface of roller members 320-1, 320-2 to introduce, in a general sense, a braking force based on a predetermined coefficient of friction. Each of the first and second torque regulators 322-1, 322-2 may be configured to be actuated independently from each other to adjustably increase and/or decrease the anti-rotational force based on a signal received from, for example, the controller 104 of FIG. 1. Preferably, the torque regulators 322-1, 322-2 may be configured to be actuated together or otherwise in a uniform manner such that each supplies a substantially equal anti-rotational force at substantially the same moment, and/or removes/decreases a supplied anti-rotational force by a substantially equal amount and at substantially the same moment. It should be appreciated that the torque regulators 322-1 and 322-2 may also be actuated independently and produce different amounts of rotational torque resistance In any such cases, each of the torque regulators 322-1, 322-2 preferably include a configuration that maintains the supplied anti-rotational force until, for example, the controller 104 sends a control signal to the torque regulators 322-1, 322-2 to decrease and/or release the supplied rotational torque resistance. Accordingly, the EOAT 312-N may then maintain "grip" on a pre-preg ply via the first and second fingers 380-1, 380-2, via the supplied and maintained anti-rotational force, during various movement operations of a pre-preg layup routine.

Each of the first and second torque regulators 322-1, 322-2 also preferably include first and second pistons 328-1, 328-2, respectively. Each of the first and second pistons 328-1, 328-2 defines at least one surface configured to engage a portion of a corresponding roller member. For example, as shown in FIG. 3, the first piston 328-1 includes a substantially cylindrical head/member, with the substantially cylindrical head providing at least one substantially flat contact surface for directly engaging with the roller member 320-1.

As further shown in FIG. 3, each roller member 320-1, 320-2 can include a rotor section to be directly engaged by the contact surface of an associated piston. For instance, and as shown more clearly in FIG. 4, the rotor section 324-1 includes a substantially cylindrical body that is coupled to a common shaft 325-1 that extends at least partially through the first roller member 320-1.

The rotor section 324-1 is preferably configured to rotate in a fixed relationship with the roller member 320-1 such that rotation of the roller member 320-1 about a common shaft 325-1 (and more particularly, an axis of rotation defined by the common shaft) causes a proportional (and preferably equal) rotation of the rotor section 324-1, and conversely, an anti-rotational force supplied to the rotor section 324-1 by way of piston 328-1 to increase rotational resistance of the first roller member 320-1. The second finger 380-2 can include a substantially similar configuration based on, for instance, piston 328-2, rotor section 324-2, and a common shaft 325-2. Note, the common shafts 325-1, 325-2 are preferably configured to rotate about an axis that extends substantially parallel to each other, e.g., rotational axis R3 and R4.

Note, the material forming the rotor sections 324-1, 324-2 and/or pistons of each torque regulator 322-1, 322-2 may be selected to maximize resulting friction. For example, each piston may include a head 328-1, 328-2 formed from aluminum or polyacetal and/or the rotor sections 324-1, 324-2 can comprise polyurethane or polyacetal. The rotor sections 324-1, 324-2 can be configured with an outer diameter of between 6 mm and 18 mm, and preferably at least 12 mm.

Figure 5:
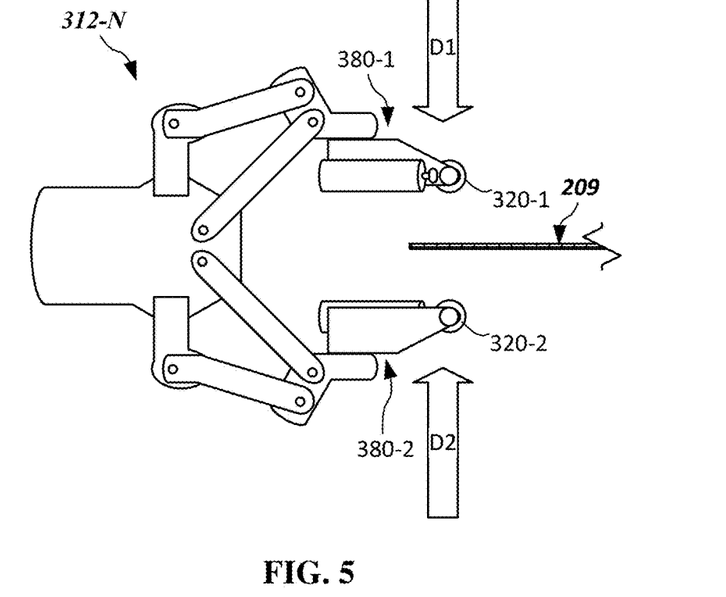
FIG. 5 shows the end of arm tool of FIG. 3 in an open configuration, in accordance with an embodiment of the present disclosure.

Turning to FIG. 5, an example of the EOAT 312-N is shown in isolation with an associated mechanical gripper arrangement in an open position. As shown, the EOAT 312-N includes first and second fingers 380-1, 380-2, disposed at an offset distance from each other to receive at least a portion of pre-preg ply 209 therebetween. Note, the EOAT 312-N may be aligned with pre-preg 209 based on, for example, movement caused by an associated robotic arm, e.g., robotic arm 210-1 (FIG. 2).

After aligning with the prep-preg ply 209, the first and second fingers 380-1, 380-2 are displaced towards each other based on, for instance, actuation provided by an associated robotic arm and the various linkages of the EOAT 312-N as discussed above. Preferably, and as shown in FIG. 5, each of the first and second fingers 380-1, 380-2 move in an opposite direction indicated generally as D1 and D2, respectively. At this time, the first and second roller members 320-1, 320-1 may be in a locked or unlocked configuration, e.g., based on a supplied anti-rotational force or the absence thereof. Preferably, the first and second roller members 320-1, 320-2 are supplied with an anti-rotational force, e.g., via pistons 328-1, 328-2 (See FIG. 3), prior to the first and second roller members 320-1, 320-2, engaging surfaces of the pre-preg ply 209.

Accordingly, and as shown more clearly in FIG. 6, the first and second fingers 380-1, 380-2 may supply a normal force (or compressive force) on opposite sides (also referred to herein as first and second surfaces) of the pre-preg 209 once transitioned to a closed configuration. The anti-rotational force supplied to each roller member may then be selectively increased/decreased during movement operations. For example, as shown in FIG. 6, the piston 328-1 is shown as supplying an anti-rotational force to the rotor section 324-1 of the first roller member 320-1. The anti-rotational force may be supplied along a direction generally shown as D3, with an imaginary line extending along D3 being substantially parallel with the longitudinal axis 350 (See FIG. 3) of the EOAT 312-2 and substantially transverse relative to the longitudinal axis/rotational axis of each of the first and second roller members 320-1, 320-2.

Figure 7A:
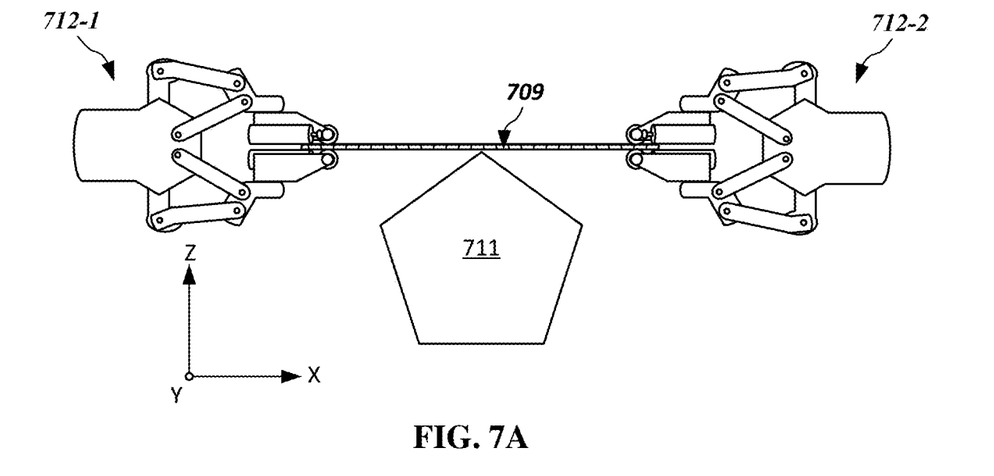
FIGS. 7A-7C collectively show a sequence of predetermined movements by a plurality of end of arm tools during a pre-preg ply layup process, in accordance with an embodiment of the present disclosure.
Figure 7B:
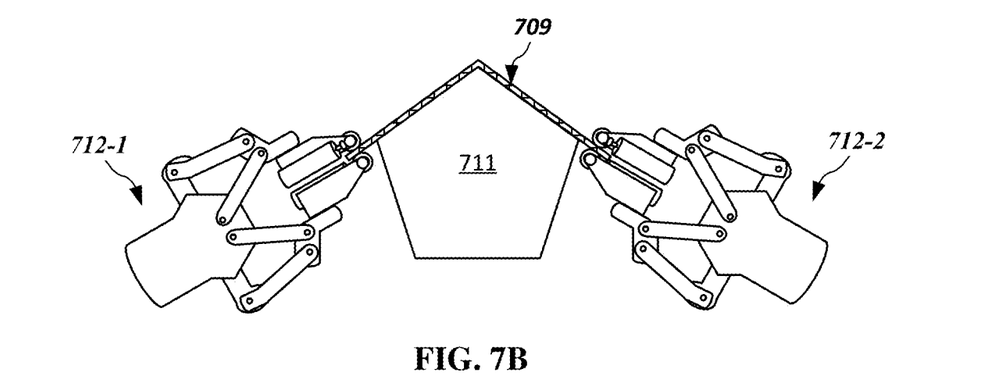
Figure 7C:
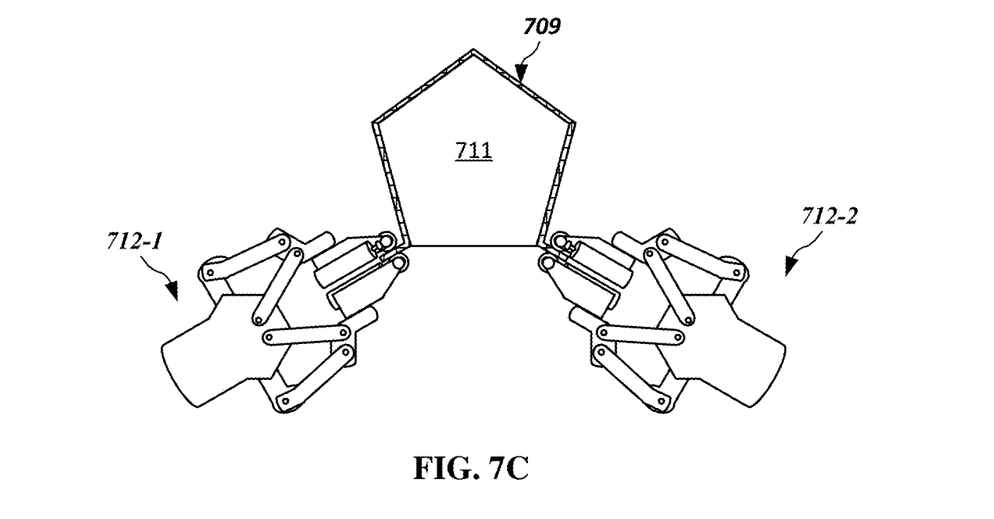
Figure 8:
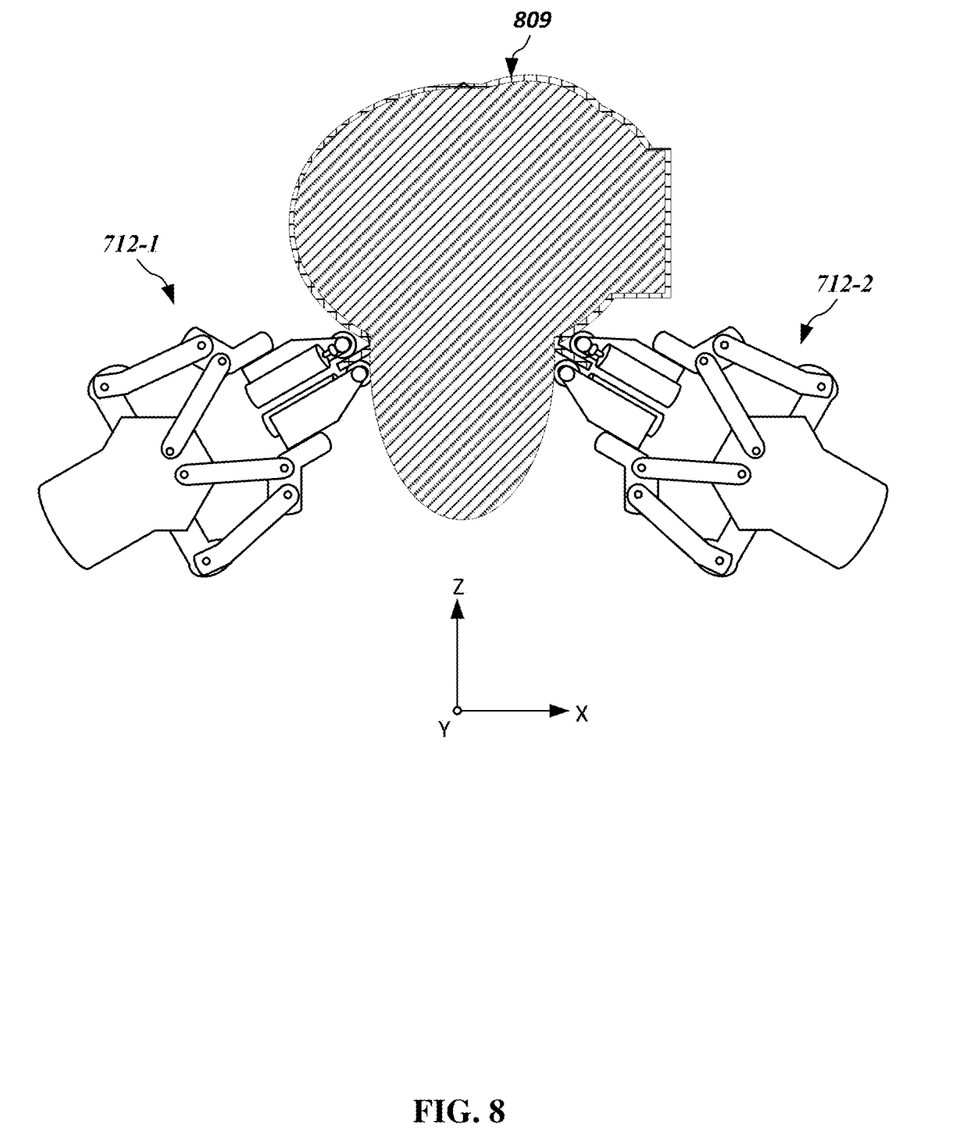
FIG. 8 shows a cross-sectional view of a target mold and a plurality of end of arm tools tensioning a pre-preg ply about the target mold, in accordance with an embodiment of the present disclosure.

FIGS. 7A-7C shown an example sequence of movements during a pre-preg layup routine to provide a given part design using a plurality of EOATs configured consistent with the present disclosure. As shown, at least a first EOAT 712-1 includes an associated mechanical gripper arrangement in a closed configuration to securely grip a first end of a pre-preg ply 709, and at least a second EOAT 712-2 includes an associated mechanical gripper arrangement in a closed configuration to securely grip a second end of the pre-preg ply 709. The first and second EOATs 712-1, 712-2 may be controlled via a robotic arm control system, e.g., the robotic arm control system 102 of FIG. 1, and be configured substantially similar to the EOAT 312-N of FIGS. 3 and 4, the description of which will not be repeated for brevity.

Each of the first and second EOATs 712-1, 712-2 may then be aligned along an X, Y, and Z axis such that the pre-preg ply 709 is brought to engage one or more surfaces of the pre-preg mold 711 (also referred to herein as a target pre-preg mold or simply a target mold). Subsequent movements of the first and second EOATs 712-1, 712-2 as shown in FIGS. 7B and 7C include the same maintaining a predetermined in-plane tension to cause the pre-preg ply 709 to tension and conform to surfaces of the target pre-preg mold 711.

Note, the target pre-preg mold 711 can include a plurality of contours, and the shape/profile of the target pre-preg mold 711 is not intended to be limiting. For example, as shown in the cross-section of FIG. 8, the target pre-preg mold 809 can include a wide range of shapes and profiles including asymmetrical contours/bodies, regular or irregular shapes/profiles, and N number of facets/surfaces.

Figure 9:
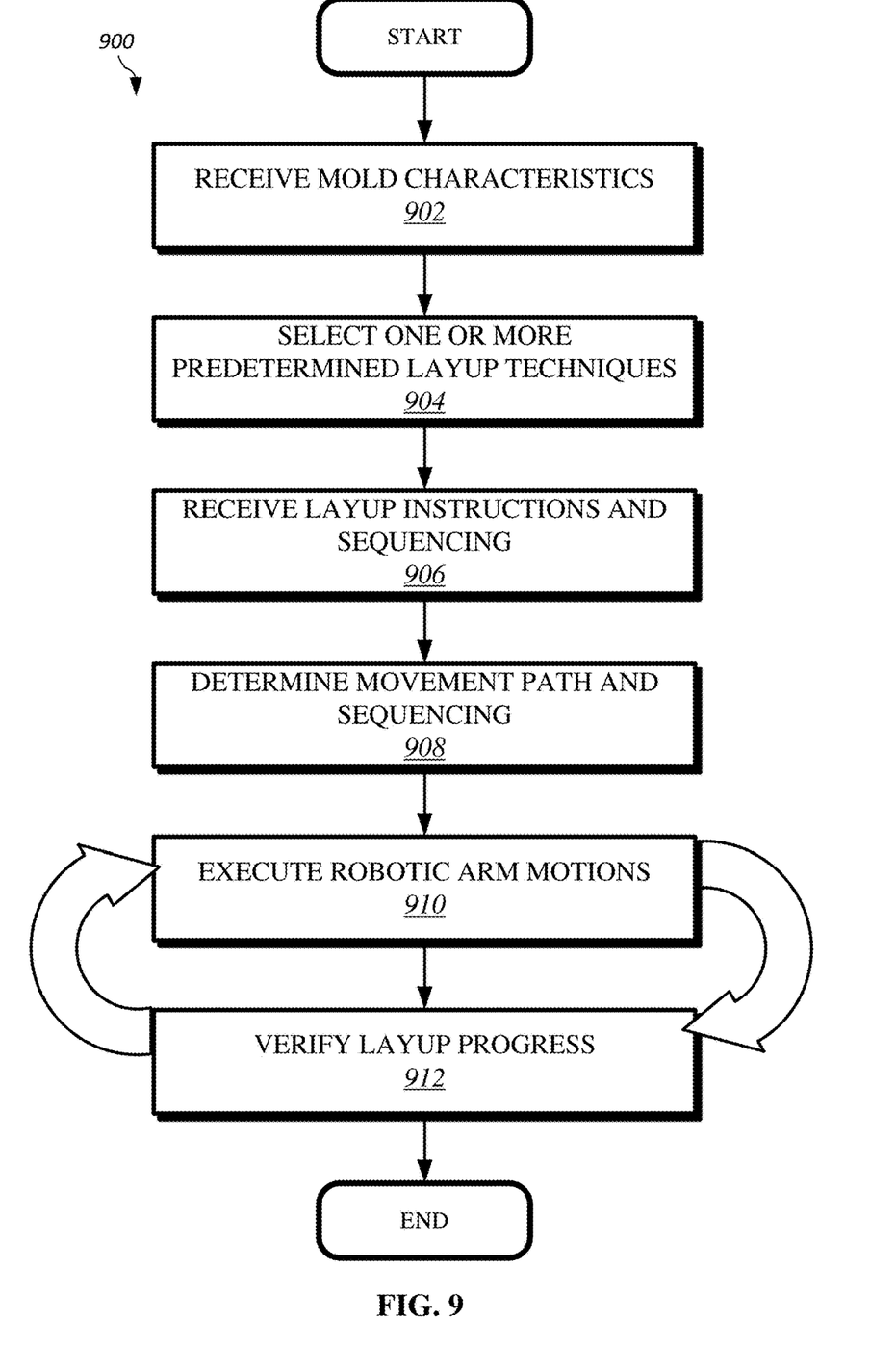
FIG. 9 shows an example process for performing automated layup of a pre-preg ply, in accordance with an embodiment of the present disclosure.

FIG. 9 shows one example process 900 that exemplifies various aspects and features of the present disclosure. The example process 900 may be performed by, for example, the robotic arm control system 102 of FIG. 1 and N number of robotic arms being implemented with EOATs consistent with the present disclosure. In particular, the controller 104 of the robotic arm control system 102 may be configured to execute acts of the example process 900, although this disclosure is not limited in this regard.

In act 902, the controller 104 receives mold characteristics from, for example, the memory 106. The mold characteristics can include, for example, mold dimensions and surface topology/contour definitions.

In act 904, the controller 104 selects one or more predetermined layup techniques from the memory 106. Each of the one or more predetermined layup techniques can include various predefined movement paths that substantially mimic the movements human hands would execute during pre-preg layup. In addition, the predetermined layup techniques include pathing for movements that increase the likelihood of successful formation of a final part design based upon the mold characteristics received in act 902.

In act 906, the controller 104 receives layup instructions based on, for example, the particular type of pre-preg ply to use during layup and/or the mold characteristics determined in act 902.

In act 908, the controller 104 determines movement and path sequencing. The controller 104 preferably determines the movement and path sequencing based on the selected one or more predetermined layup techniques. This can include, for example, establishing a plurality of movements to move robotic arms and/or EOATs in three-dimensional space, and opening/closing the mechanical gripper arrangements of the EOATs. Preferably, the movement and path sequencing further includes determining a target amount of compressive force to apply by each EOATs and/or an amount of anti-rotational force to supply to each roller member to securely "grip" a prep-preg ply. Therefore, the movement and path sequencing determined in act 902 can manifest as machine-readable instructions to cause various motors and actuators of the robotic arms and EOATs to perform time-synchronized, choreographed movements.

In act 910, the controller 104 executes the movement and path sequencing instructions determined in act 908. This can include the controller 104 causing the motor driver 108 to move each robotic arm and corresponding EOAT in the time-synchronized and choreographed manner as discussed above.

In act 912, the controller 104 optionally verifies layup progress using, for example, the vision controller 112. The controller 104 may then use image recognition techniques, artificial intelligence, machine learning, or any combination thereof to detect the relative success or failure of layup stages. For example, and within the context of FIGS. 7A-7C, such verification can include determining whether pre-preg 709 has conformed/sheared to the target pre-preg mold 711, or whether defects/failures have occurred, such as wrinkling/surface discontinuities, damage/tearing of the pre-preg ply 709, and/or an unintentional release of the pre-preg ply 709 by an EOAT.

As therefore may now be appreciated the present invention is directed at an end of arm tool (EOAT) for use during manufacture of parts using one or more pre-impregnated composite plies comprising a base defining a robotic arm mounting section to mount to a robotic arm and a joint section and a mechanical gripper arrangement coupled to the joint section of the base. The mechanical gripper arrangement comprises at least first and second fingers disposed opposite each other to receive a pre-impregnated composite ply therebetween and selectively apply a compressive force thereto and a first roller member coupled to the first finger, the first roller member to engage a first surface of the pre-impregnated composite ply and apply the compressive force to grip the pre-impregnated composite ply. The mechanical gripper may further include a first torque adjuster to selectively provide a rotational torque resistance to the first roller member.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a surface cleaning apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. An end of arm tool (EOAT) for use during manufacture of parts using at least one pre-impregnated composite ply comprising:
   a base defining a robotic arm mounting section to mount to a robotic arm and a joint section;
   a mechanical gripper arrangement coupled to the joint section of the base, the mechanical gripper arrangement comprising
      at least first and second fingers disposed opposite each other to receive the pre-impregnated composite ply therebetween and selectively apply a compressive force thereto;
      a cylindrical first roller member, which rotates about a first roller member rotational axis, coupled to the first finger;
      a cylindrical second roller member, which rotates about a second roller member rotational axis, coupled to the second finger;
      the first and second cylindrical roller members arranged to engage opposite first and second surfaces, respectively, of the pre-impregnated composite ply which are on opposite sides of the pre-impregnated composite ply separated by a thickness of the pre-impregnated composite ply, and apply the compressive force against the pre-impregnated composite ply between the first and second roller members on the opposite sides of the pre-impregnated composite ply with the first and second roller members disposed opposite each other.

2. The EOAT of claim 1, wherein the mechanical gripper arrangement further comprises:
   a first torque adjuster to selectively provide a rotational torque resistance to the first roller member.

3. The EOAT of claim 2, wherein the first torque adjuster includes a surface to engage the first roller member and supply the rotational torque resistance.

4. The EOAT of claim 2, wherein the rotational torque resistance supplied by the first torque adjuster to the first roller member of the first finger is configured to increase rotational resistance of the first roller member such that the first and second fingers maintain grip at a fixed point on the pre-impregnated composite ply during movements about a target pre-preg mold.

5. The EOAT of claim 2, wherein the rotational torque resistance supplied by the first torque adjuster to the first roller member of the first finger is configured to prevent rotation of the first roller member until a linear release force is introduced by pulling the EOAT away from the pre-impregnated composite ply.

6. The EOAT of claim 2, wherein the rotational torque resistance supplied by the first torque adjuster to the first roller member is along a direction that extends substantially transverse relative to a rotational axis of the first roller member.

7. The EOAT of claim 2, wherein the rotational torque resistance is equal to or greater than 2.0 in-lb.

8. The EOAT of claim 2, wherein the first torque adjuster is coupled to the first finger and has a longitudinal axis that extends substantially transverse relative to a longitudinal axis of the first roller member.

9. The EOAT of claim 2, wherein the first torque adjuster includes a piston to supply the rotational torque resistance to the first roller member.

10. The EOAT of claim 9, wherein the first roller member further comprises:
   a common shaft that extends through the first roller member, the common shaft defining the first roller member rotational axis; and
   a rotor section coupled to the common shaft, the rotor section including a surface to receive the rotational torque resistance supplied by the piston and generate friction therefrom that increases rotational resistance of the first roller member and allows the first and second fingers to securely grip the pre-impregnated composite ply therebetween.

11. The EOAT of claim 2, wherein the mechanical gripper arrangement further comprises a second torque adjuster to selectively provide a rotational torque resistance to said second roller member.

12. The EOAT of claim 11 wherein the rotational torque resistance supplied by the second torque adjuster to the second roller member of the second finger is configured to increase rotational resistance of the second roller member such that the first and second fingers maintain grip at a fixed point on the pre-impregnated composite ply during movements about a target pre-preg mold.

13. The EOAT of claim 1, wherein the mechanical gripper arrangement comprises linkages coupled to the joint section, the linkages to allow the first and second fingers to travel towards each other to grip the pre-impregnated composite ply therebetween.

14. A system for performing layup of a pre-impregnated composite ply, the system comprising:
   a first robotic arm having a first end of arm tool (EOAT);
   a second robotic arm having a second EOAT;
   wherein each of the first and second EOATs comprise:
   a base defining a robotic arm mounting section to mount to a corresponding robotic arm;
   first and second fingers coupled to the base and disposed opposite each other to grip a pre-impregnated composite ply therebetween, the first finger including a cylindrical first roller member, which rotates about a first roller member rotational axis, and the second finger including a cylindrical second roller member, which rotates about a second roller member rotational axis, the first roller member and the second roller member arranged to apply a compressive force against the pre-impregnated composite ply between the first and second roller members on opposite sides of the pre-impregnated composite ply with the first and second roller members disposed opposite each other;
   a first torque adjuster to selectively provide a rotational torque resistance to said first roller member;
   a second torque adjuster to selectively provide a rotational torque resistance to said second roller member.

15. The system of claim 14, further comprising a controller communicatively coupled to the first and/or second robotic arm, the controller including one or more movement sequences to cause the first and/or second robotic arms to perform movements about a target mold such that the pre-impregnated composite ply conforms to contours of the target mold.

16. The system of claim 14, wherein the first and second EOATs of the first and second robotic arms, respectively, grip the pre-impregnated composite ply on opposite sides relative to each other.

17. The system of claim 14, wherein the rotational torque resistance supplied to the first and/or second roller members is configured to securely grip the pre-impregnated composite ply such that the first and second EOATs can introduce in-plane tension into said pre-impregnated composite ply held therebetween.

* * * * *